United States Patent
Baggenstoss

(10) Patent No.: US 8,867,862 B1
(45) Date of Patent: Oct. 21, 2014

(54) SELF-OPTIMIZING ANALYSIS WINDOW SIZING METHOD

(71) Applicant: Paul M. Baggenstoss, Newport, RI (US)

(72) Inventor: Paul M. Baggenstoss, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 88 days.

(21) Appl. No.: 13/724,120

(22) Filed: Dec. 21, 2012

(51) Int. Cl.
G06K 9/36 (2006.01)
G06T 3/40 (2006.01)

(52) U.S. Cl.
CPC .................................. *G06T 3/40* (2013.01)
USPC .......................... 382/280; 382/276; 382/278

(58) Field of Classification Search
USPC ............ 382/210, 280, 278, 128, 276; 381/22, 381/104, 106, 107; 375/240.16; 324/307; 359/561; 700/94; 704/200.1, 208, 206, 704/209, 203, 500, 503, 504
See application file for complete search history.

(56) References Cited

U.S. PATENT DOCUMENTS 5,394,473 A * 2/1995 Davidson ................... 704/200.1
5,774,837 A * 6/1998 Yeldener et al. ............. 704/208

OTHER PUBLICATIONS

Baggenstoss, Paul M., On the Equivalence of Hanning-Weighted and Overlapped Analysis Windows Using Different Window Sizes, article, 1 Jan. 2012, pp. 27-30, vol. 19, No. 1. IEEE, USA.

* cited by examiner

*Primary Examiner* — Anh Do
(74) *Attorney, Agent, or Firm* — James M. Kasischke; Michael P. Stanley

(57) ABSTRACT

A method of selecting an optimal window length in a digital processing system includes receiving a digital signal and analyzing the signal with a group of Hanning windows having different sizes. The windows being arranged so that they can be scaled to be comparable. The digital signal is windowed with each selected window and a transform is computed. The transformed signal is scaled and corrected. A metric is computed from the resulting signal for each window. The metrics are compared and the window size is selected based on agreement with a user defined metric. The specific window function, shift and scaling are such that the resulting analysis is mathematically equivalent across different window sizes.

15 Claims, 2 Drawing Sheets

SELF-OPTIMIZING ANALYSIS WINDOW SIZING METHOD

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The current invention relates to a method of signal analysis for signals of unknown duration or bandwidth.

(2) Description of the Prior Art

The formation of overlapped Hanning-weighted analysis windows is a very common first stage of processing in many time-series analysis applications. The FFT typically follows the window analysis. This is the case, for example, in the short-time Fourier transform (STFT) which is a widely used front-end for a variety of applications including automatic speech recognition (ASR). It is often necessary to arbitrarily choose an analysis window size that is a compromise between the desire for good time-domain and frequency-domain resolution. In order to handle a wide range of input time-scales, it is sometimes necessary to use multiple analysis window sizes in parallel. But this approach creates a new problem—the resolution of ambiguous results. In other words, one has to decide which FFT size is appropriate for a given input data record. A related technique is spectrogram combining where STFTs are combined in such a way that the choice of best FFT size is made at each grid point in the time and frequency plane. An important step toward solving the comparison problem is the assurance that the various SIFT representations are in some way "equivalent". One possible definition of "equivalent" is the existence of an orthonormal linear transformation relating one analysis at a given window size to another at a different window size. This definition has relevance from a number of different viewpoints—from linear subspace analysis to statistical methods including the PDF projection theorem. See "The PDF Projection Theorem and the Class-Specific Method", IEEE Transactions on Signal Processing, Vol. 51, No. 3 (March 2003). There is a trivial case where two analyses are related by a permutation and thus equivalent. Consider a time-series where the total number of samples T is divisible by $N_1$ and $N_2$. If we analyze with a rectangular window function and use no overlap between processing windows, the two analyses with window sizes $N_1$ and $N_2$ are permutations of the same input samples. Unfortunately, when a non-rectangular window function is used and the processing windows are overlapped, there is in general no permutation or orthonormal transformation relating the two analyses.

Thus, there is a need for a method that will allow comparisons between windowed data having different lengths when non-rectangular window functions are used.

SUMMARY OF THE INVENTION

A first object of the invention is to determine the most appropriate analysis window sizes for an incoming signal.

A second object is to provide a method of analysis for a signal having pulses of unknown duration.

Accordingly, there is provided a method of selecting an optimal window length in a digital processing system includes receiving a digital signal and analyzing the signal with a group of Hanning windows having different sizes. The windows being arranged so that they can be scaled to be comparable. The digital signal is windowed with each selected window and a transform is computed. The transformed signal is scaled and corrected. A metric is computed from the resulting signal for each window. The metrics are compared and the window size is selected based on agreement with a user defined metric. The specific window function, shift and scaling are such that the resulting analysis is mathematically equivalent across different window sizes.

Other objects and advantages of the present invention will become apparent from the following description, drawings and claims.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1:
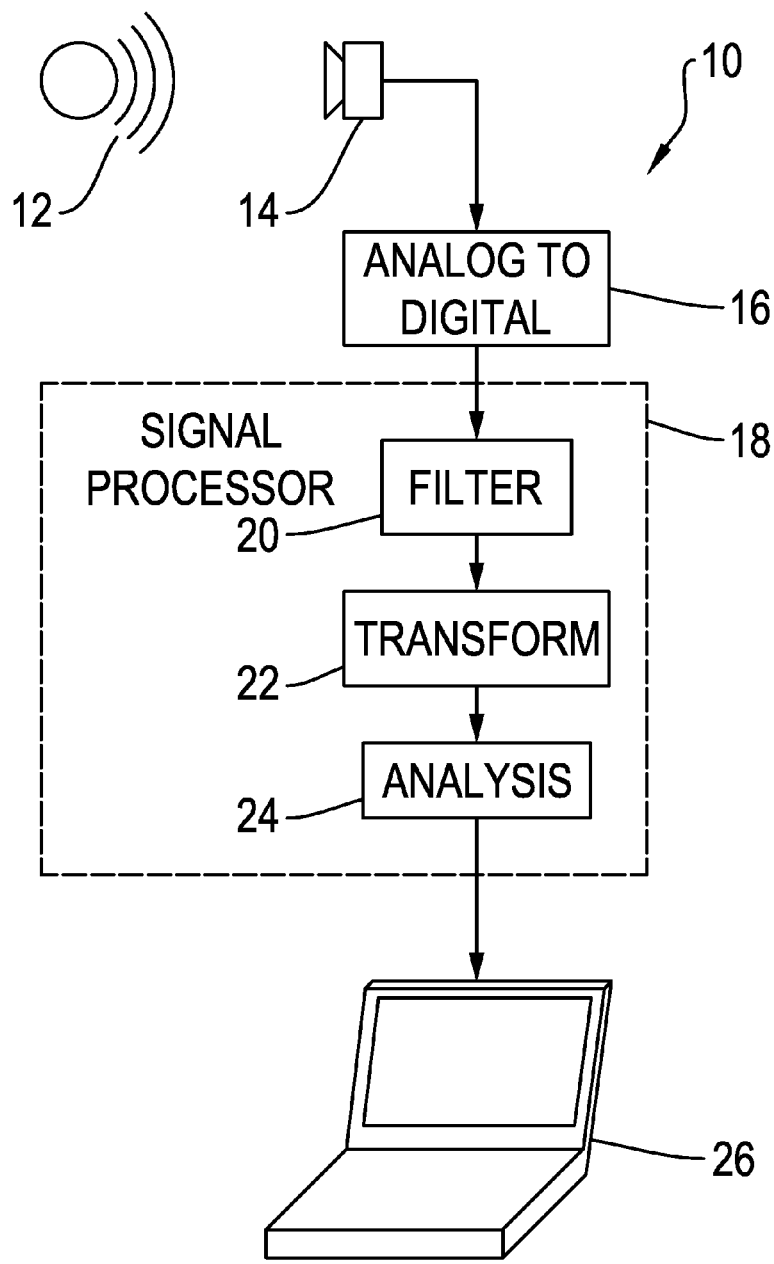
FIG. 1 is a diagram showing apparatus that could be used to practice the embodiments.

FIG. 1 provides an apparatus 10 for executing this method. An unknown environmental signal 12 is received at a sensor 14. Analog data from sensor 14 is converted into digital data by analog to digital convertor 16 at a sample rate. Digital data from analog to digital convertor 16 is joined to a signal processor 18. Signal processor 18 is capable of applying at least one windowing function 20 to the digital data for selecting a time or frequency resolution for analysis. If multiple windowing functions are applied, the signal processor can apply these windowing functions sequentially or concurrently. The windowed data is provided to a linear transform 22 such as a fast Fourier transform, discrete cosine transform, discrete wavelet transform or the like to produce a transform. The transform provides the amplitude of the signal according to the various basis functions of the transform. In the case of the FFT, this means according to various frequencies. These groups of amplitudes are known as bins. Parameters related to the bins can be analyzed in an analysis component 24 to give the characteristics of the environmental signal as user output 26 or as input to another process.

The method of this invention is particularly designed for acoustic data; however it can also be applied to other types of data, such as that associated with seismic, radar and radio signals.

The mathematics behind this method is given in the following text. Input data sample X has a length T such that $X=[x_1, x_2 \ldots x_T]'$. Length T is given in a number of digital samples. It is desirable to analyze X into length N overlapped, shaded windows. The windows are shifted by K samples at each update. D is the ratio of window size to time shift such that:

$$D = \frac{N}{K} \qquad (1)$$

With T being a multiple of K and X being circularly indexed so that $x_{T+i}=x_i$, there will be exactly DT/N processing windows. The length N processing windows are denoted by:

$$y_t = [x_{K(t-1)+1}w_1, x_{K(t-1)+2}w_2, \ldots x_{(K(t-1)+N}w_N]' \qquad (2)$$

where N is the window length and $w = \{w_1, w_2 \ldots w_N\}$ is the window function. Y is the complete window analysis, the concatenation of the various windowed analysis windows, $Y = \{y_1, y_2 \ldots y_{DT/N}\}$. The conversion from X to Y is a linear transformation that can be written as Y=A X where A is a DT×T matrix and Y is the length DT concatenation of the DT/N window $y_t$.

Two critical properties occur when using the Hanning weight function. The Hanning weight function is given as:

$$w_i = \frac{1 + \cos\left(\frac{2\pi(i-1)}{N}\right)}{c}, \quad 1 \le i \le N \qquad (3)$$

where c is a constant.

The overlap—add reconstruction of the input X is possible if the shifted window functions add to a constant. This means that the rows of matrix A must add to a constant. The sum of row i of A is:

$$\sum_{k=0}^{D-1} \frac{w_{i+k\frac{N}{D}}}{D} = \frac{D + \sum_{k=0}^{D-1} \cos\left(\frac{2k\pi}{D}\right)}{c} = \frac{D}{c}; D \ge 2 \qquad (4)$$

wherein the summation in the numerator resolves to 0 when $D \ge 2$. Another required property is that the square of the shifted window functions must add to 1 or that the squares of the elements in each row of matrix A must add to 1. This does not happen for Hanning-2 (D=2) weightings, but it does happen for all weightings with $D \ge 3$ where the sum of the squares of row i of A is:

$$\sum_{k=0}^{D-1} w^2_{i+\frac{kN}{D}} = \qquad (5)$$

$$\sum_{k=0}^{D-1} \left[\frac{1 + \cos\left(\frac{2k\pi}{D}\right)}{c}\right]^2 = \frac{D}{c^2} + \sum_{k=0}^{D-1} \frac{\cos^2\left(\frac{2k\pi}{D}\right)}{c} = \frac{D}{c^2} + \frac{D}{2c^2} = \frac{3D}{2c^2}$$

if:

$$c = \sqrt{\frac{3D}{2}} \qquad (6)$$

the result is 1. It follows, as it explained below, that there is a linear matrix that will allow comparison between different window sizes.

By these principles, there is a full-rank orthonormal transformation $Q^{N_1 N_2}$ that allows transformation between the window analysis at $N_1$ and the window analysis at $N_2$. Mathematically this is given as:

$$Y^{N_2} = Q^{N_1 N_2} Y^{N_1} \qquad (7)$$

As described above, $N_1$ and $N_2$ must both be divisible by D and $D \ge 3$. The number of samples T must also be divisible by $N_1/D$ and $N_2/D$.

Under the conditions given above, the columns of A are orthonormal, therefore:

$$A'A = I \qquad (8)$$

where I is the T×T identity matrix. Equation (8) is a direct result of the fact that the row sums of A are constant and the sum of the squared row elements equal 1. Using the matrix form of the overlap-add method, X can be restored from $Y^N_1$ using:

$$X = (A^{N_1})' Y^{N_1} \qquad (9)$$

$Y^N_2$ can be generated using:

$$Y^{N_2} = A^{N_2} X = A^{N_2} (A^{N_1})' Y^{N_1} \qquad (10)$$

The matrix $$\tilde{Q}^{N_1 N_2} = A^{N_2}(A^{N_1})' \qquad (11)$$

is a DT×DT linear transformation of rank T that converts from window analysis $Y^N_1$ to $Y^N_2$, so it is rank-deficient. Note that $A^N$ is rank T. The missing rank can be restored using the orthogonal subspace of rank (D−1)T. The extended DT×DT matrix is:

$$Q^N = [A^N \tilde{A}^N]' \qquad (12)$$

where $\tilde{A}^N$ is any DT×(D−1)T matrix of orthonormal columns spanning the subspace orthogonal to the columns of $A^N$. Since:

$$Q^{N_1 N_2} = Q^{N_1} Q^{N_2 \prime} = A^{N_2}(A^{N_1})' + \tilde{A}^{N_2}(\tilde{A}^{N_1})' \qquad (13)$$

then it follows that $$(Q^{N_1 N_2})' Q^{N_1 N_2} = I. \qquad (14)$$

The Hanning-D analyses can be viewed purely in terms of orthonormal matrices or rotations. A linear orthogonal transform such as the fast Fourier transform (FFT), discrete cosine transform (DCT) or discrete wavelet transform (DWT) can occur after this rotation. This transform isn't required to be the same in each branch and can also be implemented as an orthonormal matrix multiplication. Thus, all points can be transformed by a series of coordinate system rotations.

Figure 2:
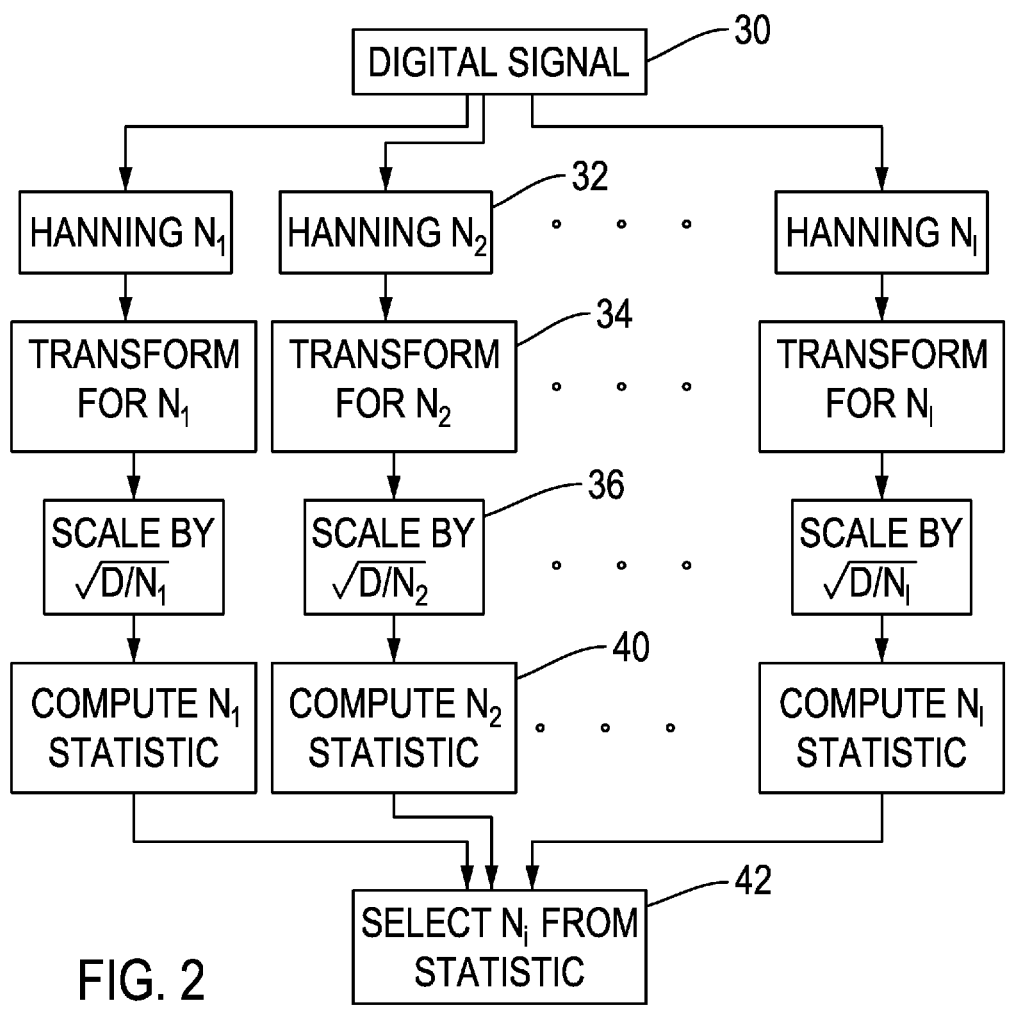
FIG. 2 is a block diagram showing one embodiment of the invention.

FIG. 2 provides a block diagram showing application of this method. A digital signal is provided to the process in block 30. Digital signal 30 is provided to a plurality of functions 32 as described above. These can be a set of Hanning-3 functions having sample lengths of $N_1, N_2, \ldots N_I$ where I is the total number of functions 32. The set of sample lengths can be calculate geometrically, linearly or at values determined by a user based on an estimate of the components of the input signal. The output of each of these functions 32 is provided to a transform 34 of the same length, $N_i$. For most purposes a fast Fourier transform could be used, but this transform 34 could be other linear transforms such as a discrete cosine transform, discrete wavelet transform or the like.

The transformed output is scaled in block 36 by the factor $$\sqrt{\frac{D}{N_i}}$$

the square root of the ratio of D to the length $N_i$ of the transform.

A statistic is computed for each length $N_i$ in block 40. This statistic summarizes the useful information in the transform output bins. An example of a statistic is to compute the mean square bin amplitude, and/or to locate the largest bin amplitude. Because independent of the window size $N_i$, there are the same number DT of total bins, and because of the scaling in block 36, the bins have the same statistics under noise only input. Therefore, it is possible to create a statistic in block 40 that has the same output statistics under noise only hypothesis no matter what the window size $N_i$. As provided above, this statistic is comparable among the different windowing function lengths and transforms because of the windowing function parameters and the scaling. A preferred length $N_i$ can then be selected from this statistic in block 42. This preferred length can be utilized either to give information about the signal such as pulse length or to select the best linear transform type and transform length for the given signal.

A first example of using this method is in detecting pulses of unknown duration. Searching for the optimal Fast Fourier Transform (FFT) size on a given digitized input signal is tantamount to pulse length estimation. This method was demonstrated utilizing synthetic data that consisted of 768 samples of independent, identically distributed, Gaussian noise plus a short Hanning-weighted sinusoidal pulse of random frequency and starting time. The pulse length of the short pulse, denoted by P, was 96, 192, or 384 samples. The signal to noise ratio was quite low, and the pulse was difficult to find visually in the time-series. In order to maintain detectability at short pulse lengths, the amplitude was varied to the P-dependent value $15P^{-1/2}$ at the peak of the Hanning-shaped envelope.

The following procedure was performed to form a detection statistic that has identical noise-only distribution independent from the analysis window size. A set of sizes was determined as being likely window sizes. These include the following number of samples, N: (72, 96, 144, 192, 288, 384, 576, 768). For each of these sizes, a Hanning-3 analysis (D=3) was performed. The fast Fourier transform of the analysis window is calculated for each number of samples. The resulting bins are scaled by $$\sqrt{\frac{D}{Ni'}}$$

giving a mean square bin value of 1 under the statistical hypothesis that the input is independent Gaussian noise of variance 1 (called the $H_0$ hypothesis). Next, the magnitude-square of each bin is calculated. Because the transform is the FFT in which the two end bins are real-valued, whereas the rest are complex valued, we need to specially handle the end bins. Therefore, the two end magnitude-squared bins (representing the zero frequency and Nyquist frequency) are added together and divided by two, giving an end-bin value. The end-bin value and the remaining N/2−1 magnitude-squared bins represent a set of N/2 exponentially distributed bins having mean 1 under $H_0$, satisfying the requirement that the statistics are independent of the transform size N under $H_0$.

Once the exponentially-distributed bins are computed for all the analysis windows for the chosen analysis window size N, the exponentially distributed bins of all the analysis windows are combined into a vector w which will have a constant length of DT/2 regardless of N. In this example, this results in (3×768/2)=1152 exponentially distributed bins regardless of N. As a summarizing statistic, the power law statistic is computed for each analysis window size according to:

$$z_N = \sum_{i=1}^{DT/2} w_i^{\gamma} \qquad (15)$$

where N is the chosen analysis window size and $\gamma$=2.5. This is known as Nuttall's power law detector.

Under the $H_0$ hypothesis, the distribution of w does not depend significantly on N. It is always a set of DT/2 bins having standard exponential distribution with mean 1. There is, however, statistical dependence between bins that is imparted on w by the Hanning weighting, but this is not important if the elements of w are treated as unordered. Under the $H_0$ hypothesis, the distribution of the feature $z_N$ must be essentially independent of the number of samples, N.

In the demonstration, two hundred independent time-series were produced at each pulse length. Each sample was analyzed with each analysis window size N and $z_N$ was evaluated. The pulse length estimate was:

$$\hat{P} = \arg\max_N z_N \qquad (16)$$

In experiments, it can be seen that most of the estimates are at or near the true pulse length, while for noise only, they are widely distributed.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method of selecting a transform length for use on a digital processing system comprising the steps of:
   receiving digital data related to a periodic physical signal as a plurality of samples taken over time;
   selecting a maximum, linear transform having an overlap factor D that is at least three and a size $N_f$ that is divisible by D;
   selecting a summarizing statistic based on user criteria concerning transform length such that the summarizing statistic is independent of window size $N_i$ under a noise-only hypothesis;
   determining a family of Hanning windowing functions of lengths $N_0, N_1, \ldots N_f$, the length of each windowing function being identified as $N_i$, each windowing function shifted by $K=N_i/D$ samples and overlapped by $N_i-N_i/D$ samples;
   conducting a set of analyses of the input signal utilizing each member $N_i$ of the determined family of Hanning windowing functions, each analysis providing a windowed signal at the window length $N_i$;
   calculating the linear transform in accordance with the selected linear transform of length $N_i$ each windowed signal $N_i$, said calculated transform having a plurality of bins, each bin representing the amplitude of the windowed signal according to a particular basis function of the selected linear transform;
   scaling the bins from the calculated transform of each windowed signal to make the bins independent of window size $N_i$;
   computing the summarizing statistic from the scaled bins of each windowing function window size $N_i$ in a way that is independent of the window size $N_i$ under a noise-only hypothesis;

comparing said summarizing statistics of each windowing function window size $N_i$ to determine the transform size $N_i$ that is closest to said user criteria concerning transfer length; and utilizing the determined transform size $N_i$ in analysis of said received digital data.

2. The method of claim 1 wherein lengths $N_0, N_1, \ldots N_f$, of said family of Hanning windowing functions are geometrically distributed throughout the range of lengths $N_0$ to $N_f$.

3. The method of claim 1 wherein lengths $N_0, N_1, \ldots N_f$, of said family of Hanning windowing functions are linearly distributed throughout the range of lengths $N_0$ to $N_f$.

4. The method of claim 1 further comprising steps of:

estimating potential signal components from the input signal; and determining lengths $N_0, N_1, \ldots N_f$, of said family of Hanning windowing functions based on said estimated potential signal components.

5. The method of claim 1 wherein the step of scaling comprises scaling each bin by the square root of the product of the number D and the reciprocal of the window length, $N_i$.

6. The method of claim 1 wherein:

said selected linear transform is a fast Fourier transform;

said summarizing statistic is a power law detector giving a power law statistic value for each windowing function window size $N_i$; and said step of comparing includes determining the transform size $N_i$ that has the maximum power law statistic value and selecting that transform size $N_i$ as the transform size being closed to said user criteria.

7. The method of claim 1 wherein said step of utilizing the determined transform size comprises utilizing the determined transform size as an estimate of pulse lengths.

8. The method of claim 1 further comprising the step of transforming said received digital data into the frequency domain utilizing the determined transform size $N_i$.

9. The method of claim 1 wherein said periodic physical signal is an audio signal.

10. The method of claim 1 wherein said periodic physical signal is a radio signal.

11. A method of selecting a transform length for use on a digital processing system comprising the steps of:

receiving digital data related to a periodic physical signal as a plurality of samples taken over time;

selecting an overlap factor D as a whole number of at least three;

selecting a family of window sizes $N_0, N_1, \ldots N_f$, the length of each window size being identified as $N_i$, such that each $N_i$ is equal to a time shift K multiplied by the overlap factor D;

selecting linear transforms of lengths $N_1, \ldots N_i, \ldots N_f$;

selecting a summarizing statistic based on user criteria concerning transform length such that the summarizing statistic is independent of window size $N_i$ under a noise-only hypothesis;

determining a family of Hanning windowing functions of lengths $N_0, N_1, \ldots N_f$, each windowing function shifted by $K=N_i/D$ samples and overlapped by $N_i-N_i/D$ samples;

conducting a set of analyses of the input signal utilizing each member $N_i$ of the determined family of Hanning windowing functions, each analysis providing a windowed signal at the window length $N_i$;

calculating the linear transform in accordance with the selected linear transform of length $N_i$ each windowed signal $N_i$, said calculated transform having a plurality of bins, each bin representing the amplitude of the windowed signal according to a particular basis function of the selected linear transform;

scaling the bins from the calculated transform of each windowed signal to make the bins independent of window size $N_i$;

computing the summarizing statistic from the scaled bins of each windowing function window size $N_i$ in a way that is independent of the window size $N_i$ under a noise-only hypothesis;

comparing said summarizing statistics of each windowing function window size $N_i$ to determine the transform size $N_i$ that is closest to said user criteria concerning transfer length; and utilizing the determined transform size $N_i$ in analysis of said received digital data.

12. The method of claim 11 wherein said step of utilizing the determined transform size comprises utilizing the determined transform size as an estimate of pulse lengths.

13. The method of claim 11 further comprising the step of transforming said received digital data into the frequency domain utilizing the determined transform size $N_i$.

14. The method of claim 11 wherein said periodic physical signal is an audio signal.

15. The method of claim 11 wherein said periodic physical signal is a radio signal.

* * * * *